US005271097A

United States Patent [19]

Barker et al.

[11] Patent Number: 5,271,097

[45] Date of Patent: Dec. 14, 1993

[54] METHOD AND SYSTEM FOR CONTROLLING THE PRESENTATION OF NESTED OVERLAYS UTILIZING IMAGE AREA MIXING ATTRIBUTES

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 935,676

[22] Filed: Aug. 25, 1992

Related U.S. Application Data

[63] Continuation of Ser. No. 213,427, Jun. 30, 1988, abandoned.

[51] Int. Cl.⁵ ............ G06F 3/14

[52] U.S. Cl. ............ 395/135; 395/118; 395/162; 364/237.2; 364/927.63; 364/927.631; 345/114

[58] Field of Search ............ 395/118, 135, 159, 162; 340/734, 721, 723

[56] References Cited

U.S. PATENT DOCUMENTS

| | | | |
|---|---|---|---|
| 3,753,240 | 8/1973 | Merwin | 395/154 |
| 4,243,984 | 1/1981 | Ackley et al. | 340/725 |
| 4,262,302 | 4/1981 | Sexton | 358/10 |
| 4,414,628 | 11/1983 | Ahuja et al. | 395/158 |
| 4,498,079 | 2/1985 | Ghosh et al. | 340/725 |
| 4,520,356 | 5/1985 | O'Keefe et al. | 340/750 |
| 4,542,376 | 9/1985 | Bass et al. | 340/724 |
| 4,555,775 | 11/1985 | Pike | 340/721 |
| 4,616,336 | 10/1986 | Robertson et al. | |
| 4,653,020 | 3/1987 | Cheselka et al. | |
| 4,663,617 | 5/1987 | Stockwell | 340/726 |
| 4,712,191 | 12/1987 | Penna | |
| 4,752,893 | 6/1988 | Guttag et al. | 364/518 |
| 4,806,919 | 2/1989 | Nakayama et al. | 340/721 |
| 4,954,819 | 9/1990 | Watkins | 340/721 |
| 5,061,919 | 10/1991 | Watkins | 340/721 |

OTHER PUBLICATIONS

Guttag, Video Display Processor Simulates Three Dimensions, Nov. 20, 1980, pp. 123–125.

*Primary Examiner*—Parshotam S. Lall
*Assistant Examiner*—Krisna Lim
*Attorney, Agent, or Firm*—Andrew J. Dillon

[57] ABSTRACT

A method is disclosed for controlling the presentation of nested overlays on a display medium. An overlay function resource is provided which includes its own environment specification which is independent of the space and data environment specifications. Mixing attributes are associated with each overlay and are utilized to determine which overlay space and data are to take precedence and be visible when the overlayed spaces are combined and imaged on a display medium. In a preferred mode of the present invention, the foreground and background of each overlay are separately controlled by the mixing attributes which define the mixing rules for the layered presentation of multiple overlays. Additionally, the order of precedence for displaying multiple overlays may be selectively or varied to provide multiple displays and to permit an individual overlay to be repetitively utilized.

5 Claims, 3 Drawing Sheets

METHOD AND SYSTEM FOR CONTROLLING THE PRESENTATION OF NESTED OVERLAYS UTILIZING IMAGE AREA MIXING ATTRIBUTES

This application is a continuation of application Ser. No. 07/213,427, filed on Jun. 30, 1988, now abandoned.

BACKGROUND OF THE INVENTION

1. Technical Field

This invention relates in general to the presentation of layered or nested overlays and in particular to the utilization of layered overlays to provide an effective three-dimensional image with a two-dimensional display medium. Still more particularly, this invention relates to the provision of an overlay function which permits the simultaneous display of a large number of overlays to form a composite display.

2. Background Art

The simultaneous display of multiple overlays or viewports is known in the prior art. For example, in multi-tasking environments it is common to have two or more applications active and displayed in viewports or "windows" which may fully or partially overlap. A known technique for handling this type of display involves a so-called "toggle" presentation wherein one of two overlapping windows is alternately displayed in accordance with the state of a control variable. This technique works well for alternately viewing one of two windows but will not permit the merging or mixing of multiple overlays to form a composite display.

Similarly, a second display technique is known for viewing layered viewports or windows which involves the utilization of a pseudo-three-dimensional cursor wherein the operator may "drive" the cursor into the display to view a layer beneath the layer being displayed. While this technique permits the user to separately view a selected one of multiple overlayed windows, it will not permit the merging or mixing of multiple overlays to form a composite display.

Recently, a system has been proposed which permits the controlled display of multiple layers of display by allowing a user to select a particular layer. For example, an architectural display of a building may be presented which depicts an outer elevation of the structure. The user may then select a second display which may depict the electrical distribution system or the plumbing system associated with the building, or some additional display which is associated with the primary display. As with the previously discussed systems, this system permits the selective presentation of one of a plurality of layered presentations but does not allow a composite presentation to be displayed.

SUMMARY OF THE INVENTION

It is therefore one object of the present invention to provide an improved method of displaying nested overlays.

It is another object of the present invention to provide an improved method of displaying nested overlays which permits multiple overlays to be simultaneously displayed in a composite presentation.

It is yet another object of the present invention to provide an improved method of displaying nested overlays which permits the order or precedence of multiple nested overlays to be selected or altered.

The foregoing objects are achieved as is now described. An overlay function resource is provided in accordance with the method of the present invention which includes its own environment specification, which is independent of space and data environment specifications. Mixing attributes are associated with each overlay and are utilized to determine which overlay space and data are to take precedence and be visible when the overlay spaces are imaged together on a display medium. In a preferred mode of the present invention, the foreground and background of each overlay are separately controlled by the mixing attributes which define the mixing rules for the layered presentation of multiple overlays. Additionally, the order or precedence for displaying multiple overlays may be selectively altered, or varied by the operator, to provide multiple displays and to permit the utilization of a particular layer in multiple applications.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
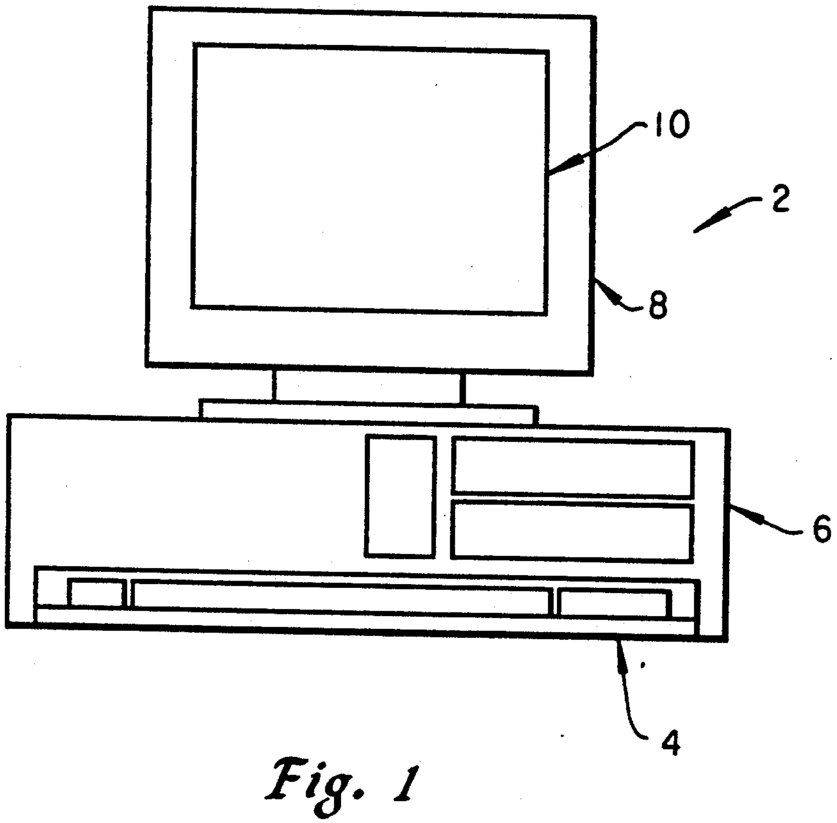
FIG. 1 is a pictorial representation of a computer which may be utilized to implement the method and system of the present invention.
Figure 2:
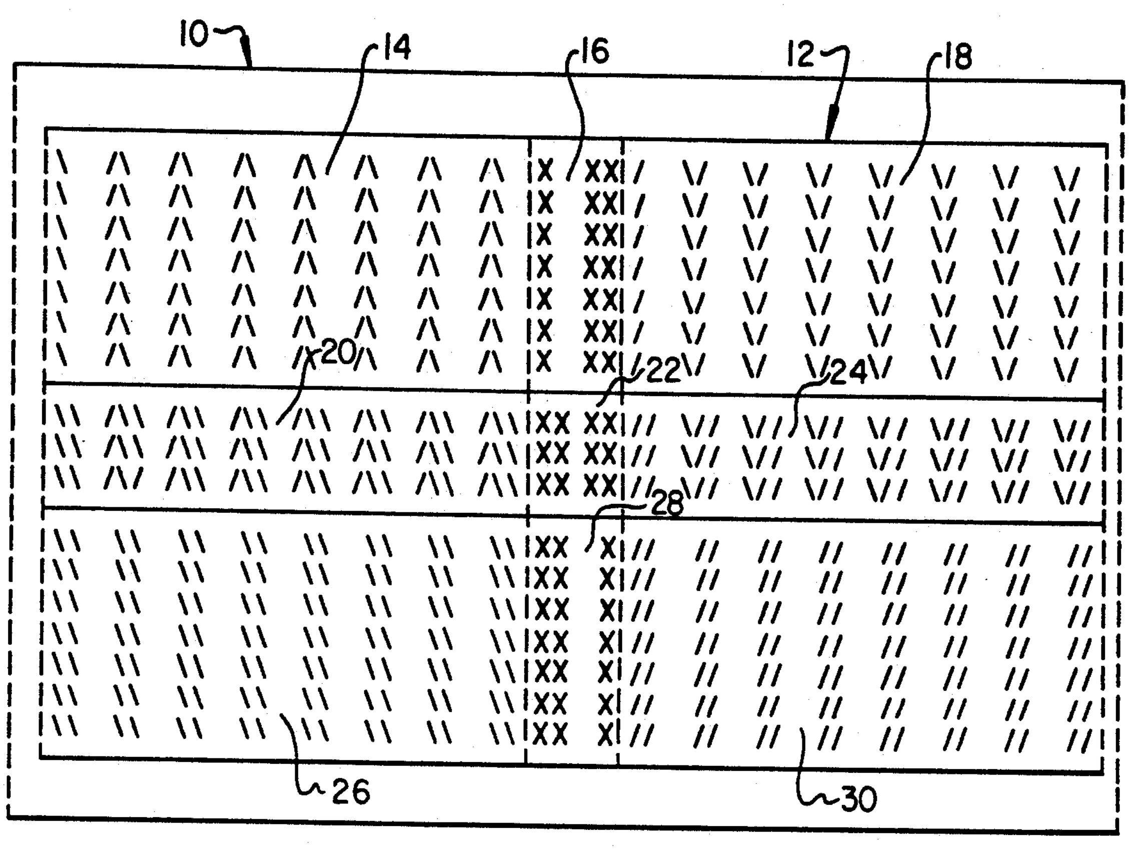
FIG. 2 depicts a pictorial representation of a computer screen which includes multiple nested overlays which are selectively combined to form a composite presentation in accordance with the method of the present invention.

With reference now to the figures and in particular with reference to FIG. 1, there is depicted a pictorial representation of a computer 2 which includes a keyboard 4, processor 6 and monitor 8 which provides a computer screen 10. Referring now to FIG. 2, there is depicted a pictorial representation of computer screen 10 which includes multiple nested overlays which are selectively combined to form a composite presentation 12 in accordance with the method of the present invention. As can be seen, computer screen 10 includes a composite presentation 12 which is divided into nine separate display areas: upper left quadrant 14; upper leg 16; upper right quadrant 18; left leg 20; midsection 22; right leg 24; lower left quadrant 26; lower leg 28; and, lower right quadrant 30.

In accordance with the method of the present invention, each display area within composite presentation 12 incorporates a selected combination of four separate overlays. The actual data within overlay 1 is depicted within upper left quadrant 14, overlay 2 is depicted within upper right quadrant 18, overlay 3 is depicted within lower left quadrant 26 and overlay 4 is depicted within lower right quadrant 30. The display within each of the remaining display areas is a result of selected combinations of these four overlays in a manner which will be explained in greater detail herein.

Figure 3:
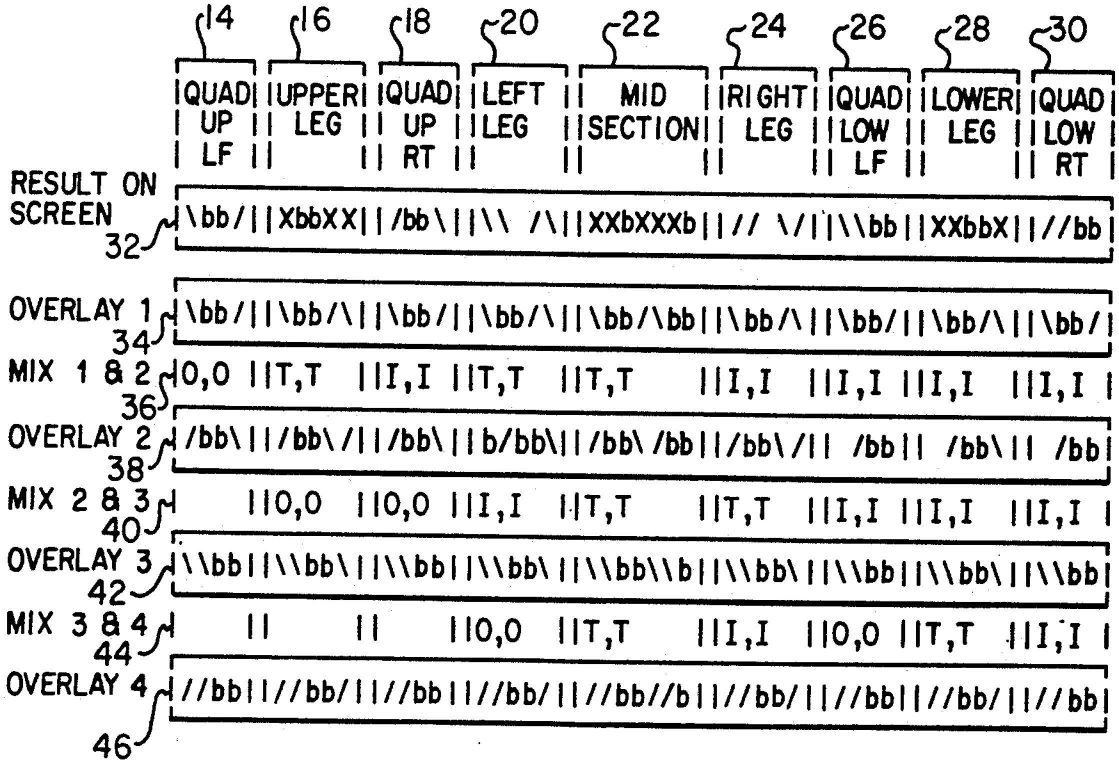
FIG. 3 is a graphic representation of the overlay function which controls the mixing of the multiple layered presentation of FIG. 1 in accordance with the present invention.

Referring now to FIG. 3, there is depicted a graphic representation of the overlay function which controls the mixing of the multiple overlays to form composite presentation 12 (see FIG. 2). As can be seen, row 32 depicts the visual result present in each display area of FIG. 2 with "b" indicating a blank space in the display. Similarly, rows 34, 38, 42, 46 depict the content of each of the four overlays which are utilized to form composite presentation 12.

Still referring to FIG. 3, rows 36, 40, and 44 depict the mixing attributes for each display area within composite presentation 12 which may be utilized, in accordance with the method of the present invention, to combine or merge the multiple overlays into the resultant display. As may be seen, each display area includes a mixing attribute between each pair of overlays which controls the combination of that pair of overlays. In the preferred embodiment of the present invention, each mixing attribute includes two portions, the first of which applies to the background of an overlay and the second of which applies to the foreground of the overlay.

The combination of multiple overlays is accomplished in accordance with the aforementioned mixing attributes as will be explained below. The first character in each mixing attribute is applied to the background of the appropriate overlay and may consist of one of the characters: "I"; "O"; and "T" or a blank space. The "I" character signifies "Ignore", indicating that the entire content of the upper overlay is to be considered invisible and does not appear. Next, the "O" character signifies "Opaque", indicating that anything below the upper overlay will not be seen through the upper overlay.

The "T" character signifies "Transparent", indicating that anything below the upper overlay will show through the background or holes in the foreground. Finally, a blank space is utilized where an "O" character above renders anything below not visible and no mixing attribute is required although in practice mixing attributes may actually be specified. These indications are also utilized as the second character in each mixing attribute and are applied in that position to the foreground of each appropriate overlay. As can be seen, by utilizing the overlay function resource depicted herein, it is possible to efficiently describe a three-dimensional view of a space on a two-dimensional medium. Further, global overlay modifications are facilitated by providing a local identifier for global overlay name mapping making it simple to add or delete overlays and to change their order by localizing the changes to the name mapping function. Similarly, the use of an overlay function resource permits individual overlays to be repetitively utilized for different purposes within a single display.

Referring again to the graphic representation of FIG. 3, several examples of the effect of the utilization of these mixing attributes may be illustrated. For example, the content of lower left quadrant 26 is generated by applying the mixing attributes I,I of row 36 between overlay 1 and overlay 2, mixing attributes I,I of row 40 between overlay 2 and overlay 3 and mixing attribute O,O of row 44 between overlay 3 and overlay 4. That is, overlays 1 and 2 are ignored and overlay 4 is not visible since it is below an opaque mixing attribute for overlay 3. Similarly, the content of midsection 22 is generated by reviewing the mixing attributes T,T of rows 36, 40, and 44 indicating that all four overlays are to be combined with transparent backgrounds.

Figure 4:
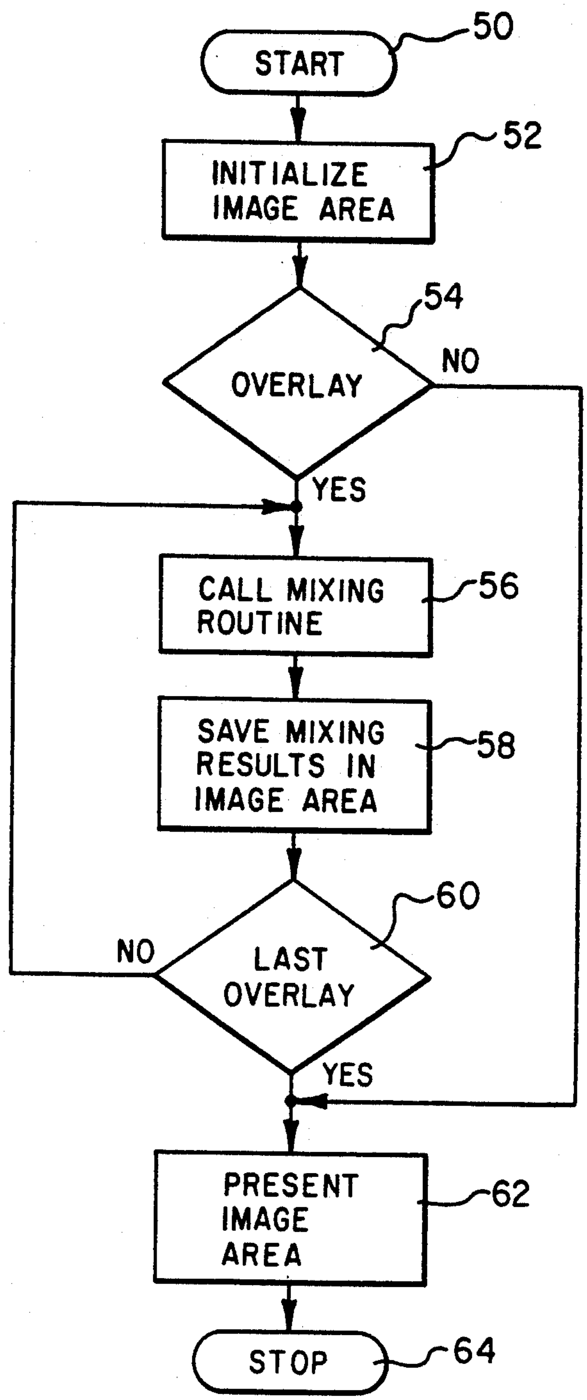
FIG. 4 is a logic flow diagram of the method of the present invention.

With reference now to FIG. 4, there is depicted a logic flow diagram of the method of the present invention. As is illustrated, after starting at block 50, the image area is initialized in block 52. Next, block 54 determines whether or not the image area includes an overlay. If not, the image area is presented, as depicted in block 62 and the program ends, as illustrated in block 64.

In the event the image area includes an overlay, block 56 depicts the calling of a mixing routine which is specified in the manner depicted in FIG. 3. The results of the application of a mixing routine are then stored, as illustrated in block 58, and block 60 is utilized to determine whether or not an additional overlay is present within the image area. If an additional overlay is present, the program returns to block 56 and the next mixing routine is called. This process continues until the last overlay has been evaluated. Thereafter, the resultant composite image is presented, as depicted in block 62 and the program ends.

Those skilled in the art will appreciate that by utilizing the overlay function resource of the present invention, it will be possible to utilize an overlay repeatedly to generate a complex composite presentation. Additionally, a self-contained method of specifying an overlay environment is utilized which makes the overlay independent of overlaid data and other overlays thereby permitting it to be reused at different locations without undesirable side affects being introduced into the overlay by the environment for the data or other overlays.

Appendix A following the specification in the present application depicts a pseudocode implementation of a presentation of nested overlays which is accomplished in the manner set forth within the logic flowchart illustrated within FIG. 4. Appendix B depicts a pseudocode implementation of the cell mixing routine described within the specification above and sets forth the manner by which the mixing attributes are utilized to combine the visual characteristics of two nested overlays. Appendix C sets forth in tabular form the mixing example of FIG. 3, whereby two or more nested overlays are combined to form a resultant composite presentation.

While the invention has been particularly shown and described with reference to a preferred embodiment, it will be understood by those skilled in the art that various changes in form and detail may be made therein without departing from the spirit and scope of the invention.

APPENDIX A

PSEUDO_CODE IMPLEMENTATION OF PRESENTATION OF NESTED OVERLAYS

```
Init Image_Area (IAREA)

(*Check for Overlay in Image Area*)
```

```
If Overlay (OVLY) in Image Area (IAREA)
    THEN Repeat----
        Get Mix Atts (OVLYU, OVLYL, IAREA, ATTS)
        (*Get foreground/background mixing attributes*)
        Call Mix_Ovly (ATTS, OVLYU, OVLYL, RES)
        (*Call mixing routine*)
        Save Mix Result (Res, IAREA)
        (*Save mixing results in image area at position
        relative to combined position of overlays*)
        Until Last Overlay Processed
        Present Image Area (IAREA)
    Else Present Image Area (IAREA)
```

APPENDIX B

PSEUDO_CODE IMPLEMENTATION F
MIX_OVLY ROUTINE

```
Case Att_type of Atts:

    "I" =    Ignore

             (*Ignore contents of upper overlay (ovlyu)*)
             (*Use contents of lower overlay*)

             Res = OVLYL

    "O" =    Opaque

             (*Upper Overlay is Opaque*)
             (*contents of lower overlay cannot be seen*)

             Res = OVLYU

    "T"      Transparent

             (*Contents of lower overlay show through to
             upper*)
             (*Combine contents of upper and lower
             overlays*)

             Res = OVLYU + OVLYL

End Case
```

APPENDIX C

MIXING EXAMPLE (See Figure 2)

```
Lower Left Quadrant (26)            Mid Section (22)

Mix Overlay 1, \ b b /              \ b b / \ b b
    Overlay 2,   / b b              / b b \ / b b

  Atts = I, I (*Ignore)               T,T (*Transparent)
  Res  =     / b b                  X b b X X b b
```

```
Mix Overlay 2,    / b b          X b b X X b b
    Overlay 3, \ \ b b           \ \ b b \ \ b

     Atts = I, I                    T,T
     Res  =    \ \ b b           X \ b X X \ b

Mix Overlay 3, \ \ b b           X \ b X X \ b
    Overlay 4  / / b b           / / b b / / b

     Atts = O, O (*Opaque)          T,T
     Res  =    \ \ b b           X X b X X X b

Result Returned = \ \ b b        X X b X X X b

Save Result in Image Area
```

We claim:

1. A method in a date processing system of controlling a presentation of a plurality of nested overlay images on a display medium, wherein each of said plurality of nested overlay images includes a background image and a foreground image, said method comprising the steps of:

defining at least one selected area within said display medium;

permitting a user to selectively and graphically characterize said background image and said foreground image of each of said plurality of nested overlay images which is imaged within said selected area within said display medium as either transparent or opaque; and combining portions of said background image and said foreground image of each of said plurality of nested overlay images which are imaged within said selected area within said display medium in accordance with said graphic characterization to form a composite image within said selected area within said display medium.

2. The method in a data processing system of controlling a presentation of a plurality of nested overlay images on a display medium according to claim 1, further including the step of presenting a display of said composite image on said display medium.

3. The method in a data processing system of controlling a presentation of a plurality of nested overlay images on a display medium according to claim 1, further including the step of selectively altering an order of precedence of displaying said plurality of nested overlays.

4. A data processing system for controlling a presentation of a plurality of nested overlay images on a display medium within said data processing system, wherein each of said plurality of nested overlay images includes a background image and a foreground image, said data processing system comprising:

means for defining at least one selected area within said display medium;

means for permitting a user to selectively and graphically characterize said background image and said foreground image of each of said plurality of nested overlay images which is imaged within said selected area within said display medium as either transparent or opaque; and means for combining portions of said background image and said foreground image of each of said plurality of nested overlay images which are imaged within said selected area within said display medium in accordance with said graphic characterization to form a composite image within said selected area within said display medium.

5. The data processing system for controlling a presentation of a plurality of nested overlay images on a display medium according to claim 4, further including means for selectively altering an order of precedence of display said plurality of nested overlays.

* * * * *